US011440347B2

(12) United States Patent
Horton

(10) Patent No.: US 11,440,347 B2
(45) Date of Patent: Sep. 13, 2022

(54) APPARATUS AND METHOD FOR REMOVAL AND INSTALLATION OF VEHICLES TIRES

(71) Applicant: Ronald Horton, Florence, AK (US)

(72) Inventor: Ronald Horton, Florence, AK (US)

(*) Notice: Subject to any disclaimer, the term of this patent is extended or adjusted under 35 U.S.C. 154(b) by 0 days.

(21) Appl. No.: 17/229,696

(22) Filed: Apr. 13, 2021

(65) Prior Publication Data
US 2022/0097453 A1    Mar. 31, 2022

Related U.S. Application Data

(60) Provisional application No. 63/013,402, filed on Apr. 21, 2020.

(51) Int. Cl.
*B60B 29/00*   (2006.01)
*B60B 31/00*   (2006.01)

(52) U.S. Cl.
CPC ............ *B60B 29/001* (2013.01); *B60B 31/00* (2013.01); *B60B 2340/52* (2013.01)

(58) Field of Classification Search
CPC ........................... B60B 29/001; B60B 29/002
See application file for complete search history.

(56) References Cited

U.S. PATENT DOCUMENTS

| | | | | | |
|---|---|---|---|---|---|
| 2,576,627 | A | * | 11/1951 | Miner | B66F 7/0633 414/427 |
| 2,600,742 | A | * | 6/1952 | Drum | B60B 29/001 414/430 |
| 3,084,819 | A | * | 4/1963 | Tropiano | B60B 29/002 414/430 |
| 3,805,983 | A | * | 4/1974 | Gallo | B60B 29/002 414/427 |
| 4,060,170 | A | * | 11/1977 | Walters | B60B 29/001 414/427 |
| 5,984,611 | A | * | 11/1999 | Warner | B60B 29/002 414/430 |
| 7,988,402 | B2 | * | 8/2011 | Adams | B60B 29/002 414/427 |
| 9,045,000 | B1 | * | 6/2015 | Giagni, Sr. | B60B 30/10 |
| 9,566,827 | B2 | * | 2/2017 | Hodges | B60B 30/00 |
| 2019/0010034 | A1 | * | 1/2019 | Edwards, Sr. | B60B 29/001 |

* cited by examiner

*Primary Examiner* — Jonathan Snelting
(74) *Attorney, Agent, or Firm* — Ariel S. Bentolia; Bay Area IP Group, LLC

(57) ABSTRACT

An apparatus having means for providing axial rotation and support of a wheel, wherein said wheel is intended for at least one of, removal, repair, inspection, installation, and replacement; means for allowing for different size wheels to be supported; means for rendering support for said means for providing axial rotation; means for allowing a lateral movement of said support rendering means along a central axis and operable for aligning the wheel with wheel studs; means for increasing a bottom surface area of said apparatus to create additional support for said apparatus; means for aiding a transportation and placement of said apparatus; and means for adjusting a vertical positioning of the wheel.

19 Claims, 12 Drawing Sheets

APPARATUS AND METHOD FOR REMOVAL AND INSTALLATION OF VEHICLES TIRES

CROSS-REFERENCE TO RELATED APPLICATIONS

The present Utility patent application claims priority benefit of the U.S. provisional application for patent Ser. No. 63/013,402, "TIRE GLIDE", Apr. 21, 2020 under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a tire glide. More particularly, certain embodiments of the invention relate to a tire glide device for ease of removal and installation of various sized tires.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Additionally, removing and installing wheels, especially larger wheels, may require a mechanic to have enough strength to manually lift and align a wheel with a vehicle's wheel studs.

Removing and installing wheels of any vehicle, commercial or industrial, may require a large amount of strain, especially when maintaining proper alignment and height. The removal of a vehicle wheel may comprise lifting the vehicle off the ground using, for example, without limitation, a hydraulic jack, removing lug nuts, and manually lifting the wheel off the vehicle's wheel studs. Similarly, installing a wheel on a vehicle may comprise lifting the wheel to a required height, aligning the wheel with the wheel studs, sliding the wheel on the wheel studs, and securing the wheel with the lug nuts. As wheels may be large and heavy, lifting and aligning a wheel may require a significant amount of strength and may heavily strain the back of a mechanic. Such strain may cause long term health problems and chronic pain and may also result in immediate injury if the wheels are improperly handled. Additionally, in many situations a wheel may need to be changed in roadside environments and by an average consumer without the mechanical expertise of a mechanic, which may be even more straining and dangerous than standard conditions.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A-1B illustrate an exemplary tire glide, wherein FIG. 1A shows a perspective view of a tire glide and FIG. 1B shows an exploded view of a tire glide, in accordance with an embodiment of the present invention;

FIGS. 2A-2B illustrate an exemplary base, wherein FIG. 2A shows a top view of a base and FIG. 2 shows a perspective view of a base, in accordance with an embodiment of the present invention;

FIGS. 4A-4B illustrate an exemplary glide table, wherein FIG. 4A shows a perspective view of a glide table and FIG. 4B shows exemplary primary rollers, in accordance with an embodiment of the present invention;

FIGS. 5A-5B illustrate an exemplary roller box, wherein FIG. 5A shows a perspective view of a roller box and FIG. 5B shows exemplary secondary rollers, in accordance with an embodiment of the present invention;

FIGS. 6A-6B illustrate an exemplary circular base, wherein FIG. 6A shows a back view of a circular base and FIG. 6B shows a front view of a circular base, in accordance with an embodiment of the present invention;

FIG. 9A-9C illustrate an exemplary alternative roller table, wherein FIG. 9A shows a front view of an alternative roller table, FIG. 9B shows a bottom view of an alternative roller table, and FIG. 9C shows a top view of an alternative roller table, in accordance with an embodiment of the present invention;

FIGS. 10A-10B illustrate exemplary rollers, wherein FIG. 10A shows exemplary rollers and FIG. 10B shows exemplary roller pins, in accordance with an embodiment of the present invention;

FIGS. 11A-11B illustrate an exemplary back plate, wherein FIG. 11A shows a front view of a back plate and FIG. 11B shows a back view of a back plate, in accordance with an embodiment of the present invention.

Figure 1A:
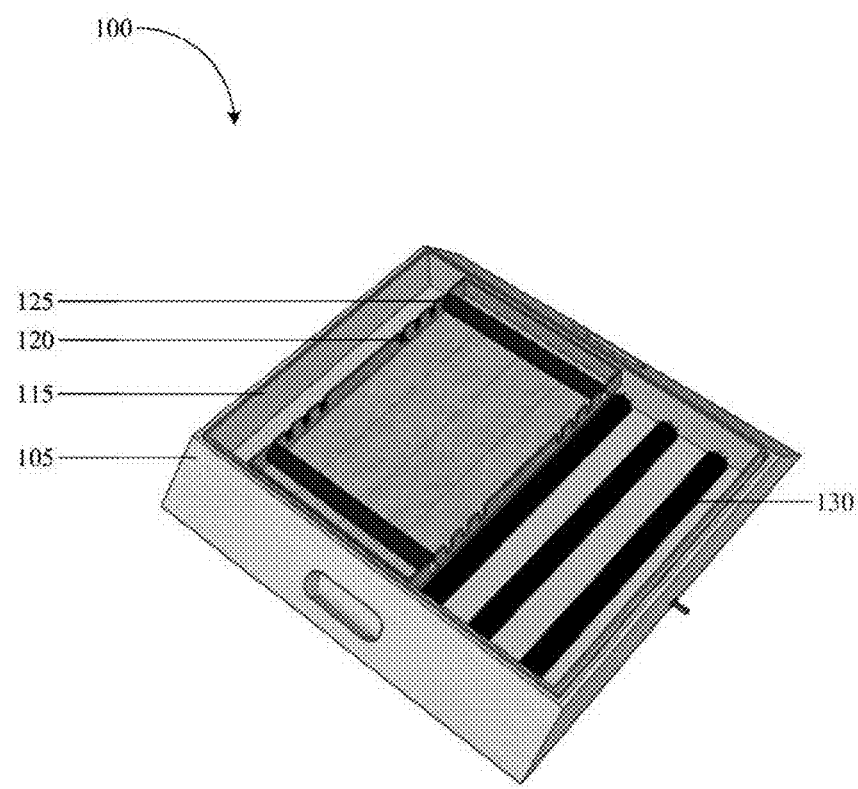

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior art that may (or may not) be provided in the present patent.

References to "end user", or any similar term, as used herein, is generally intended to mean late-stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C . . . sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 1B:
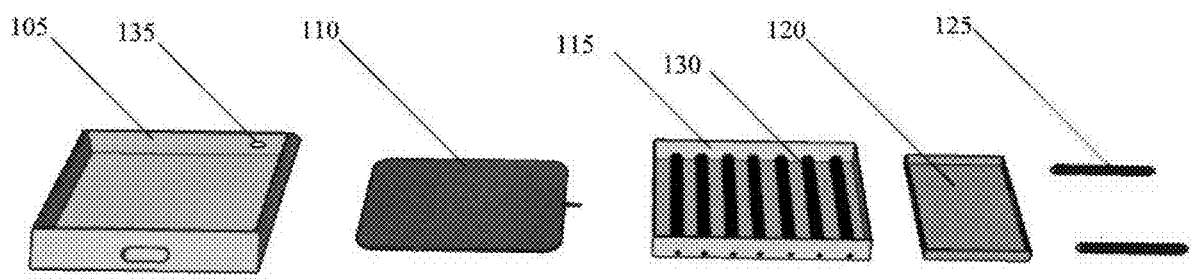

FIGS. 1A-1B illustrate an exemplary tire glide apparatus, wherein FIG. 1A shows a perspective view of a tire glide apparatus and FIG. 1B shows an exploded view of a tire glide apparatus, in accordance with an embodiment of the present invention. Tire glide 100 may improve the wheel removal and installation process by eliminating strain associated with lifting and aligning a wheel with the wheel studs of a vehicle. Tire glide 100 may comprise base section 105, airbag implement 110, roller box segment 115, glide table 120, secondary rollers 130, and primary rollers 125. Base section 105 may provide a secure foundation for tire glide 100, and act as support for the remaining components of tire glide 100. Airbag 110 may be placed in base 105 and may be used to gradually adjust the vertical positioning of a wheel intended for installation, removal, repair, restoration, inspection, and/or replacement. For example, without limitation, when installing a wheel-on-wheel studs, the wheel may be placed on top of tire glide 100 in a lowered position (i.e., airbag 110 is deflated). Airbag 110 may then be pumped with air to raise the wheel to an appropriate height for installation. Air may also be released out of airbag 110 to lower the wheel as needed. Base 105 may include tab 135 (see FIG. 1B) located within about 2 to 3 inches of the depth of the base. Roller box 115 may be placed on top of airbag 110 within base 105. Tab 135 may enable roller box to be snapped and held in place. Roller box 115 may be a foundation for glide table 120. A lip may allow glide table 120 to snap in place. Roller box 115 may include secondary rollers 130 to allow for lateral movement of glide table 120 along the central axis of tire glide 100. Such glide table 120 lateral movement may be used to more easily slide a wheel on and off of a vehicle's wheel studs. Glide table 120 may make direct contact with the tire of a wheel and may be placed on top of the secondary rollers of roller box 115 to produce the lateral movement. Glide table 120 may include a flip locking bar after a wheel is placed on rollers 125, with respect to a given tire size. Glide table 120 may also include primary rollers 125 for the axial rotation of the wheel. As such, the wheel may be axially rotated to align the wheel with the wheel studs.

While the following figures may include measurements for certain dimensions of the components of tire glide 100, as will be appreciated by one skilled in the art, the present embodiment is not limited by the dimensions shown and may be larger or smaller depending on the specific needs of a user. For example, without limitation, larger dimensions may be used in industrial environments when handling larger wheels, while smaller dimensions may be used in commercial environments.

Figure 2A:
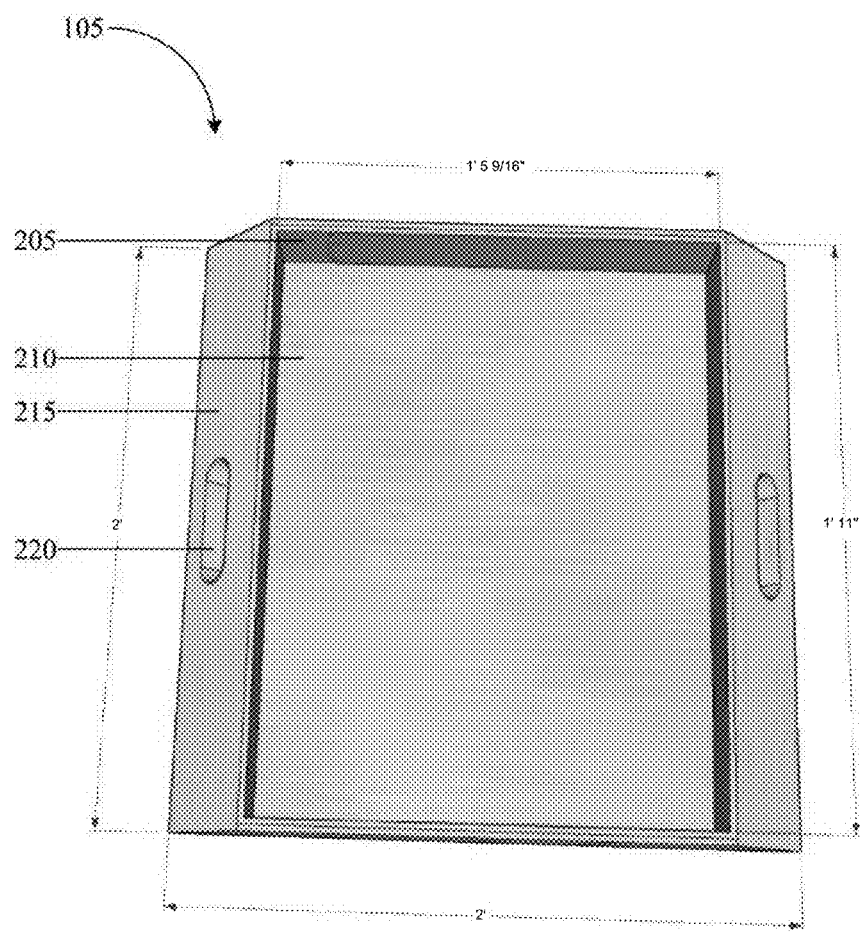
Figure 2B:
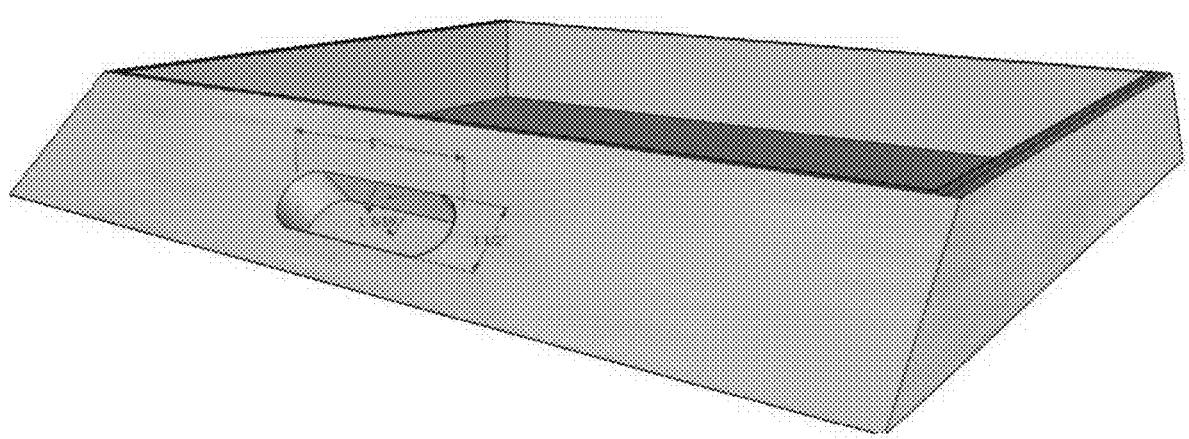
Figure 3:
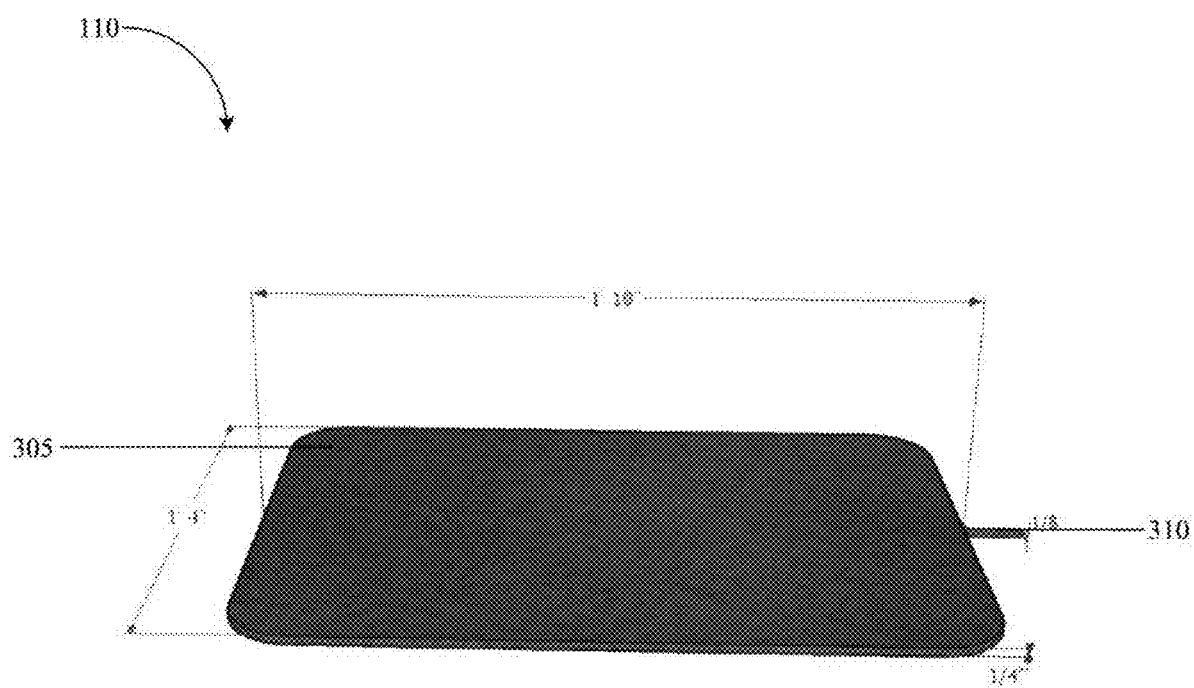
FIG. 3 illustrates an exemplary airbag, in accordance with an embodiment of the present invention.

FIGS. 2A-2B illustrate an exemplary base, wherein FIG. 2A shows a top view of a base and FIG. 2 shows a perspective view of a base, in accordance with an embodiment of the present invention. With reference to both FIGS. 1A-1B and FIGS. 2A-2B, base 105 may be adapted to support the entirety of tire glide 100 and the wheel of a vehicle, while having a substantially low profile such that minimal jacking of the vehicle may be required. Base 105 may be composed of any sturdy material known in the art, such as, without limitation, steel, aluminum, copper, iron, high density polyethylene (HDPE), wood, plastics, Kevlar, titanium, etc. Base 105 may comprise internal walls 205 and floor 210, and outer walls with angled surfaces 215 and handles 220. Base 105 may include, but not limited to, a proximate rectangular-shaped base, a substantially square-shaped, a generally round-shaped base, or a generally oblong-shaped base. Internal walls 205 and floor 210 may provide protection and support for the remaining components of tire glide 100. As tire glide 100 may be used in both outdoor and indoor environments, protection for the remaining components of tire glide 100 may prolong the overall longevity of tire glide 100. Angled surfaces 215 may create additional support for tire glide 100 while increasing bottom surface area. Handles 220 may be openings within angled surfaces 215 and may be used for ease of transportation and placement of tire glide 100. FIG. 3 illustrates an exemplary airbag, in accordance with an embodiment of the present invention. With reference to FIGS. 1A-1B and FIG. 3, airbag 110 may be used to gradually change the vertical positioning of a wheel. Airbag 110 may be composed of any suitable material known in the art, such as, without limitation, rubber, nylon, Kevlar®, gasket plated O-ring airtight chamber or any rubber or expandable material that may hold air when configured, etc. Airbag 110 may comprise body 305 and neck 310. Neck 310 may be attached to an inflation means, which may vary depending on the needs of the user. For example, without limitation, the inflation means may be a pneumatic pump, manual bulb pump, bicycle pump, etc. In the present embodiment, airbag 110 may provide precise height control of a wheel such that the wheel studs of a vehicle may be accurately aligned with the wheel. However, as will be appreciated by one skilled in the art, alternative height adjustment means may be used as an alternative or in combination with airbag 110. For example, without limitation, a scissor lift, hydraulic lifts, etc. may be used in adjusting the vertical position of a wheel.

Figure 4A:
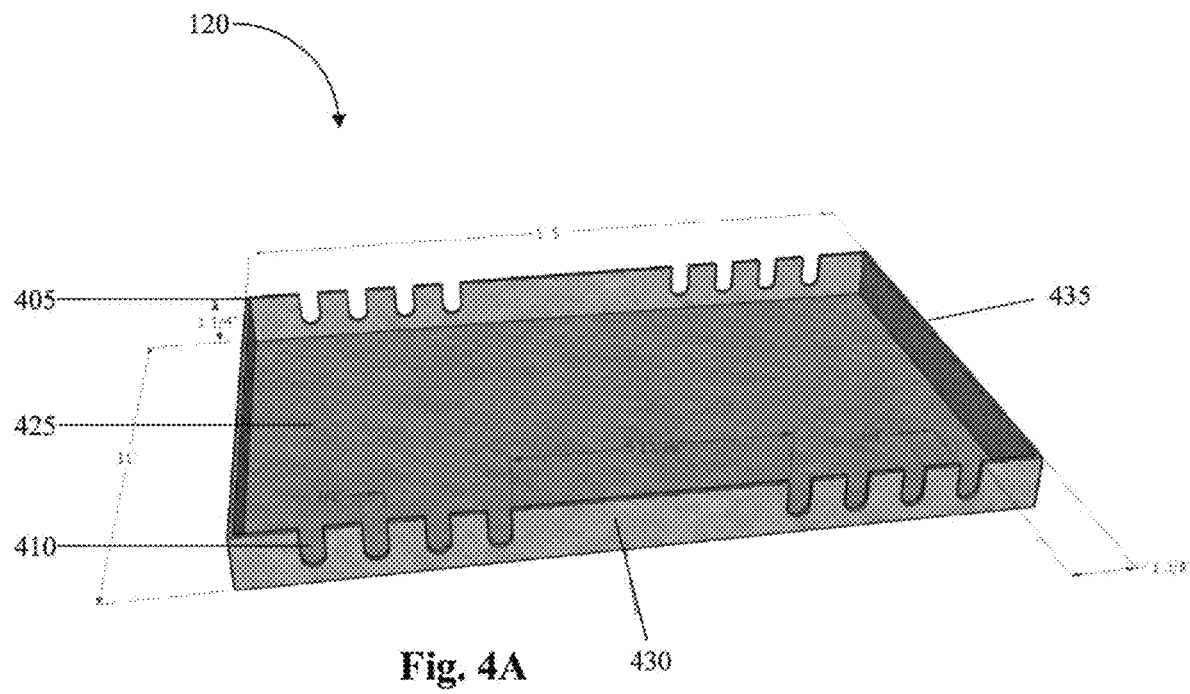
Figure 4B:
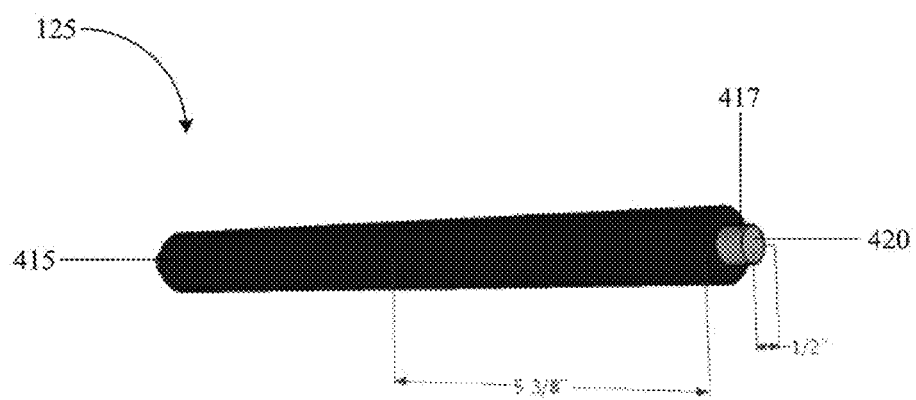

FIGS. 4A-4B illustrate an exemplary glide table, wherein FIG. 4A shows a perspective view of a glide table and FIG. 4B shows exemplary primary rollers, in accordance with an embodiment of the present invention. With reference to FIGS. 1A-1B and FIGS. 4A-4B, glide table 120 may make direct contact with the tire of a wheel intended for, but not a limitation, installation, removal, repair, restoration, inspection, and/or replacement, and may be used to adjust the axial orientation of the wheel such that the wheel may be properly aligned with the wheel studs of a vehicle. Glide table 120 may aid in aligning the wheel with the wheel studs, sliding the wheel on the wheel studs, and securing the wheel with lug nuts. Glide table 120 may comprise body 405 to provide adequate support for the wheel, long wall 430 that may comprise one or more slots 410 for the securement of one or more primary rollers 125, and short wall 435 that may comprise an outer surface that may easily glide against an inner surface of wall 510 of roller box 115. In the present embodiment, two primary rollers 125 may be used with glide table 120 to allow for the axial rotation of the wheel of a vehicle. Each primary roller 125 may comprise outer cylindrical body 415 and inner cylindrical body 417. Inner cylindrical body 417 of primary rollers 125 may be placed in slots 410 of glide table 120 at different intervals depending on the size of the wheel. In the present embodiment, rollers 125 may be placed far enough apart such that the tire of the wheel does not make contact with floor 425 of glide table 120. As outer cylindrical body 415 may freely rotate about axis 420 of primary rollers 125, the wheel may smoothly rotate with primary rollers 125 around axis 420 and allow for alignment with the wheel studs.

Figure 5A:
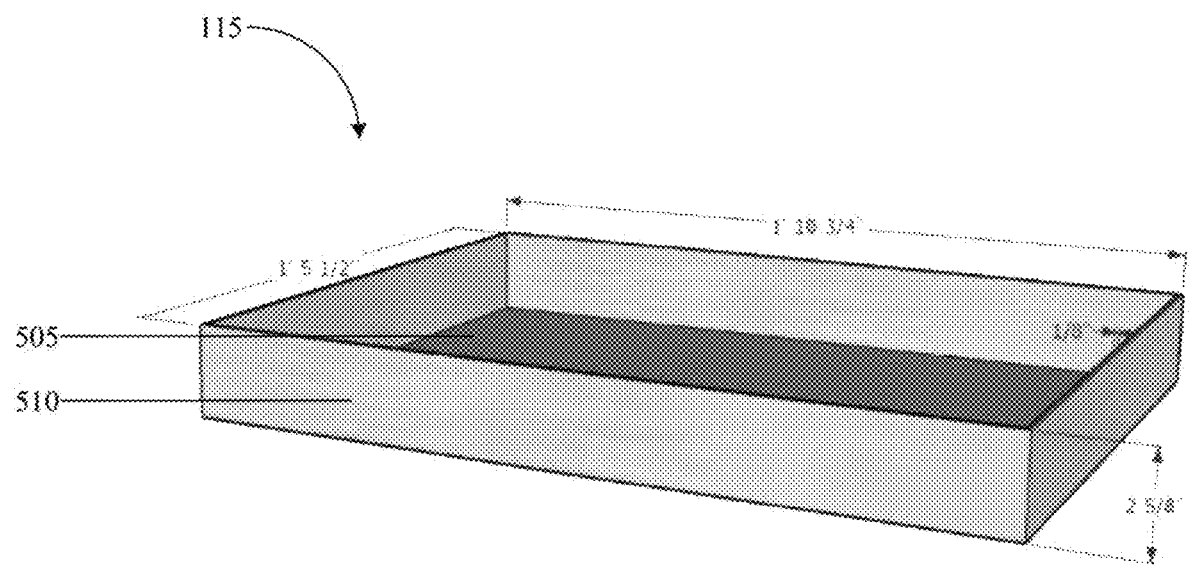
Figure 5B:
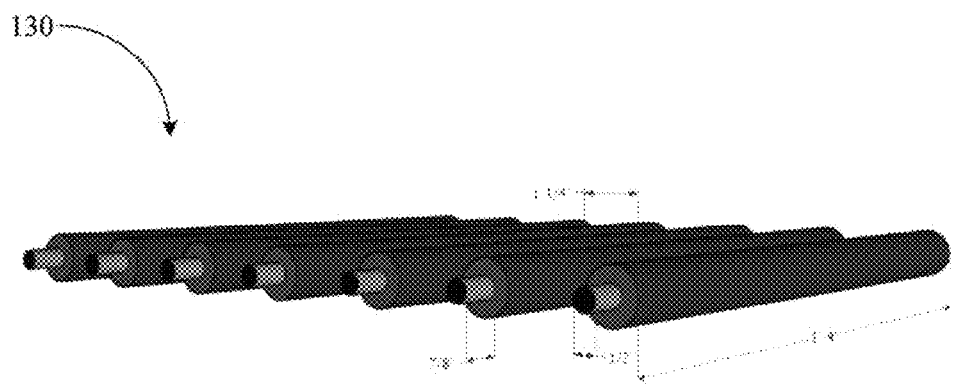
Figure 6A:
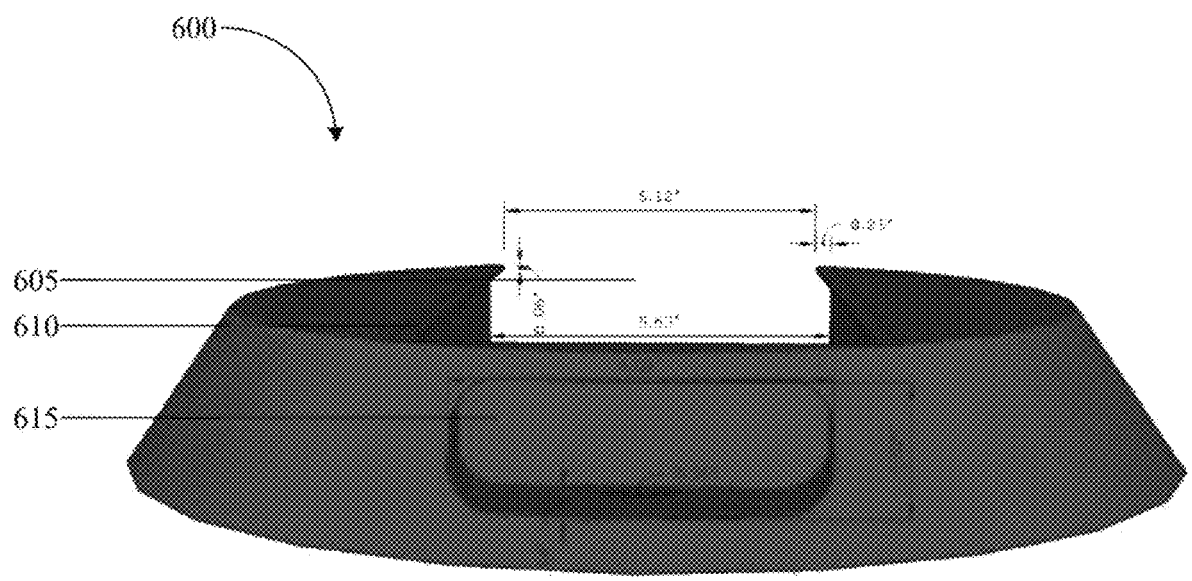
Figure 6B:
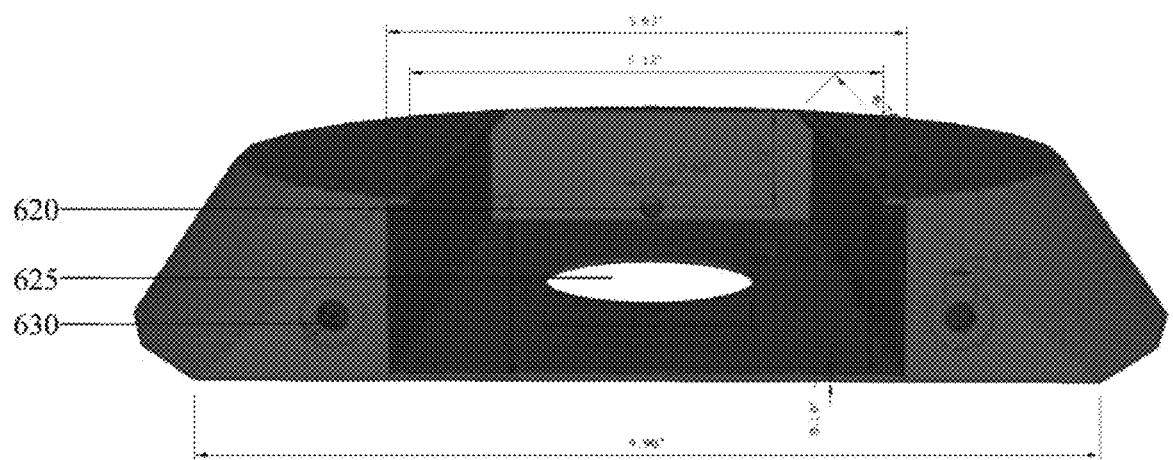

FIGS. 5A-5B illustrate an exemplary roller box, wherein FIG. 5A shows a perspective view of a roller box and FIG. 5B shows exemplary secondary rollers, in accordance with an embodiment of the present invention. With reference to FIGS. 1A-1B and FIGS. 5A-5B, roller box 115 may be placed between airbag 110 and glide table 120 within tire glide 100. Roller box 115 may be composed of any sturdy material such as, without limitation, steel, copper, aluminum, HDPE, etc., and may comprise walls 510 and floor 505. Glide table 120 may rest on top of secondary rollers 130. Secondary rollers 130 may allow for the lateral movement of glide table 120. In turn, this allows a lateral movement of a wheel resting on the primary rollers of the glide table 120 perpendicular to secondary rollers 130 such that the wheel may slide out from the wheel studs of a vehicle or be pushed onto the wheel studs of the vehicle. FIGS. 6A-6B illustrate an exemplary circular-shaped base, wherein FIG. 6A shows a back view of a circular-shaped base and FIG. 6B shows a front view of a circular-shaped base, in accordance with an embodiment of the present invention. While the embodiment shown in FIGS. 1A-5B may illustrate an industrial tire glide, a commercial tire glide is shown with reference to FIGS. 6A-11B. Circular base 600 may be used as an alternative to base 105, and may be more easily storable with, for example, without limitation, the spare tire of a vehicle because of its circular design. Circular base 600 may provide a secure platform in which to house the remaining components of the commercial tire glide. The components of the commercial tire glide may fit within center cavity 605 and may be held in place using tabs 610. Center cavity 605 may include airbag opening 620 for the routing of, for example, without limitation, the neck of an airbag, and bottom opening 625 to accommodate for trucks utilizing a cable lift system. Circular base 600 may also include handle 615 for ease of positioning the commercial tire glide. As will be further described below with reference to FIGS. 11A-11B, a back plate may be attached to circular base 600 via back plate openings 630, providing additional protection and securement for the internal components of the commercial tire glide. While in the present embodiment, circular base 600 is designed in a circular shape, alternative base shapes may be used for the commercial tire glide. For example, without limitation, the base may be square-shaped, rectangular-shaped, hexagonal-shaped, ovular-shaped, etc.

Figure 7:
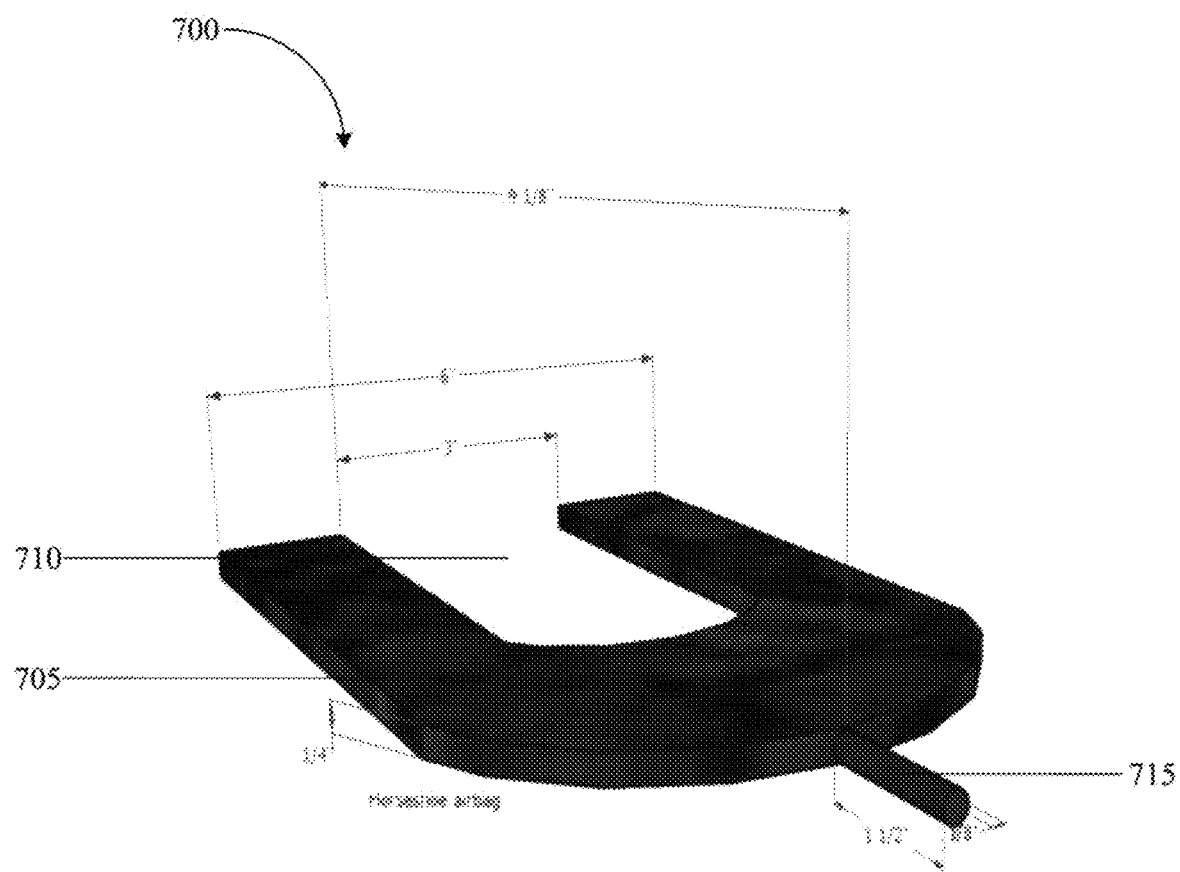
FIG. 7 illustrates an exemplary horseshoe airbag, in accordance with an embodiment of the present invention.

FIG. 7 illustrates an exemplary horseshoe airbag, in accordance with an embodiment of the present invention. Horseshoe airbag 700 may comprise body 705 and neck 715 and may be used to adjust the vertical position of a wheel when used with a commercial tire glide. With reference to FIGS. 6A-6B and FIG. 7, central gap 710 of horseshoe airbag 700, in combination with bottom opening 625 of circular base 600 may accommodate for trucks utilizing a cable lift system. Neck 715 may be routed through airbag opening 620 of circular base, and may be attached to any inflation means known in the art.

Figure 8:
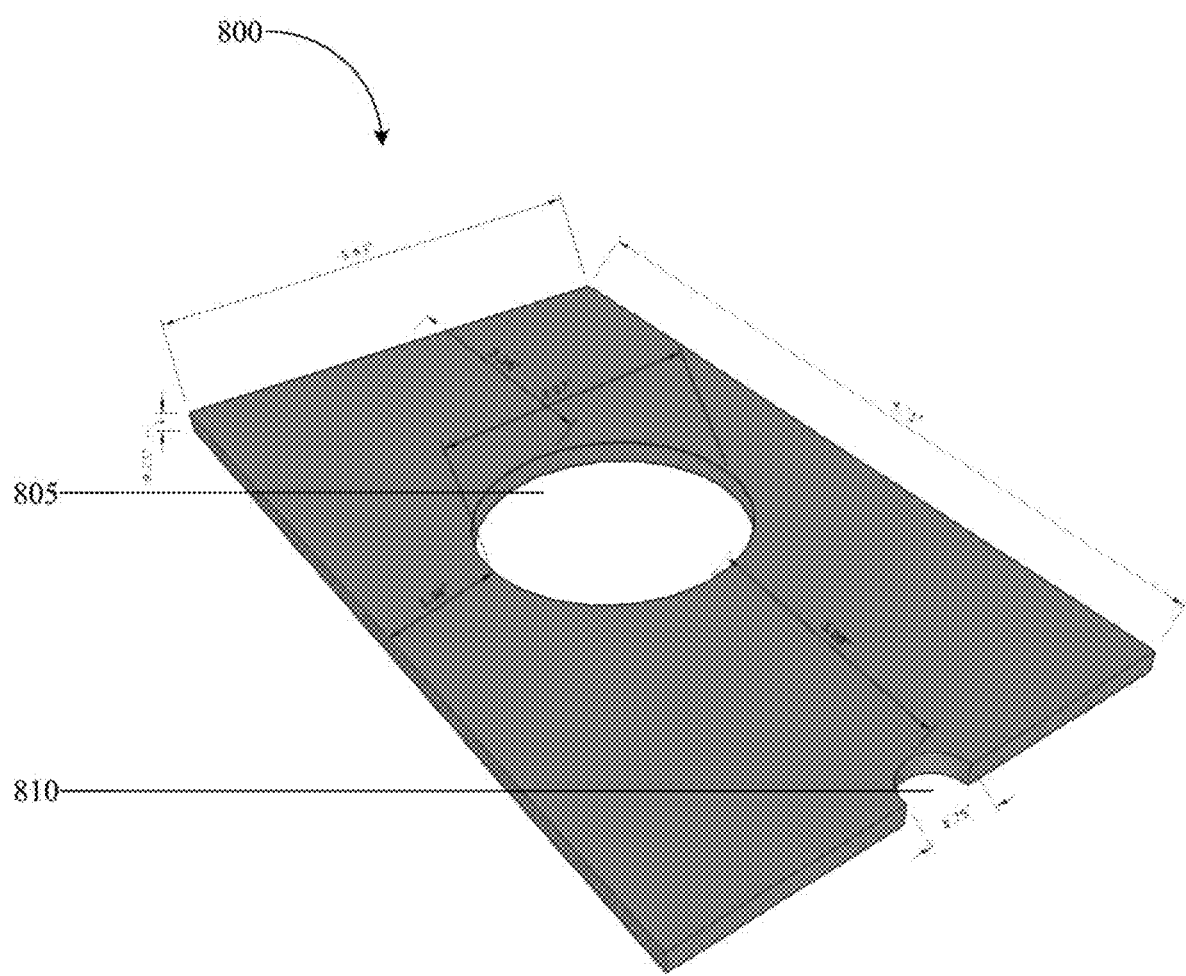
FIG. 8 illustrates an exemplary glide plate, in accordance with an embodiment of the present invention.

FIG. 8 illustrates an exemplary glide plate, in accordance with an embodiment of the present invention. With reference to FIG. 7 and FIG. 8, glide plate 800 may be placed on top of horseshoe airbag 700 and may be raised and lowered with the inflation and deflation of horseshoe airbag 700. Glide plate 800 may include openings to accommodate for the other components of the commercial tire glide, such as, without limitation, central opening 805 and rear opening 810. Central opening 805 may be used to accommodate for trucks utilizing a cable lift system. Similarly, rear opening 810 may accommodate for neck 715 of horseshoe airbag 700. In a completely lowered position, rear opening 805 may be needed for glide plate 800 to be level with the floor of circular base 600.

Figure 9A:
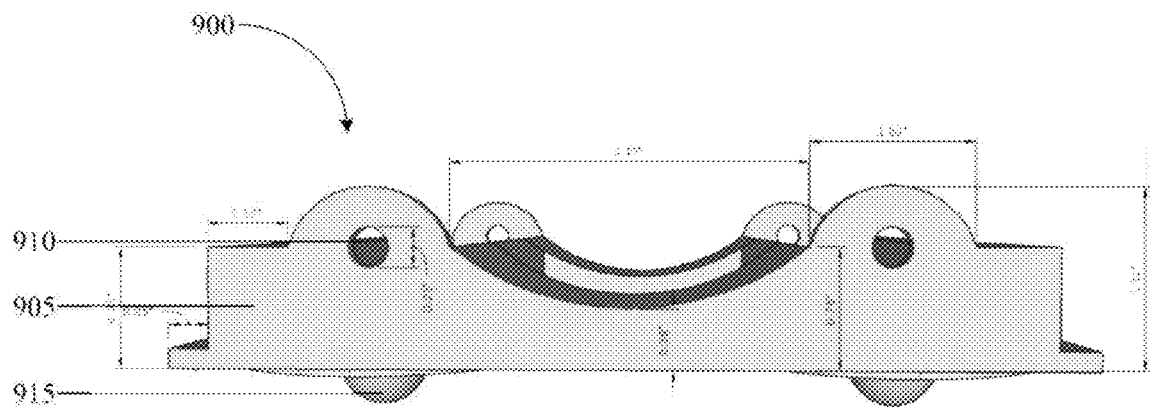
Figure 9B:
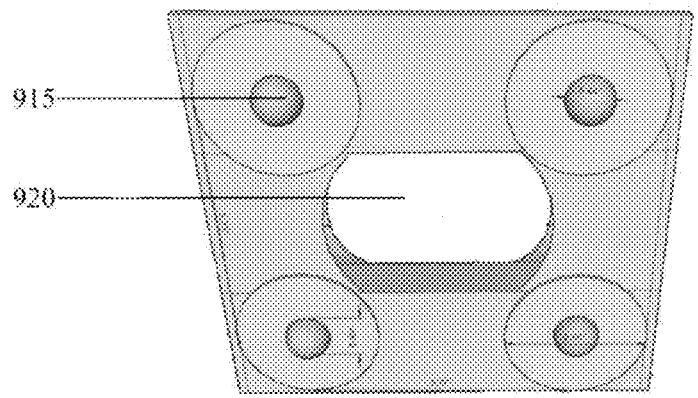
Figure 9C:
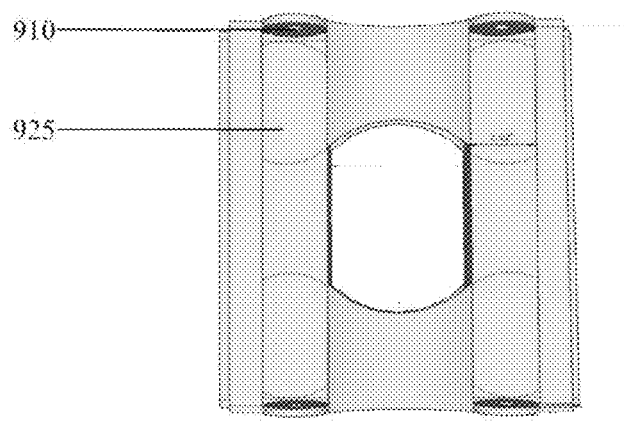

FIG. 9A-9C illustrate an exemplary alternative roller table, wherein FIG. 9A shows a front view of an alternative roller table, FIG. 9B shows a bottom view of an alternative roller table, and FIG. 9C shows a top view of an alternative roller table, in accordance with an embodiment of the present invention. Alternative roller table 900 may be more suitable for a commercial tire glide, and may comprise body 905, roller pin openings 910, table bearings 915, central opening 920, and roller grooves 925. Body 905 may be composed of any sturdy material known in the art, such as, without limitation HDPE, steel, iron, copper, aluminum, etc. Roller table 900 may allow for lateral movement of a wheel along glide plate 800 using table bearings 915. Alternative movement means may also be used in combination with or instead of table bearings 915, such as, without limitation, rollers, wheels, etc. Roller table 900 may also include central opening 920 to accommodate for trucks utilizing a cable lift system. To rotate a wheel axially in aligning the wheel with the wheel studs of a vehicle, rollers may be installed in roller pin openings 910 and roller grooves 925.

Figure 10A:
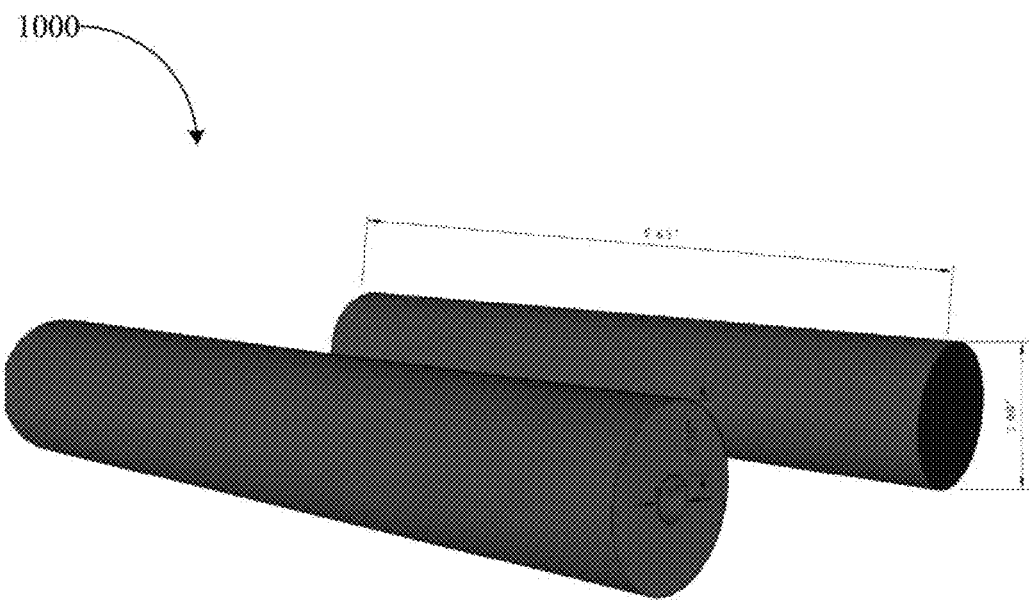
Figure 10B:
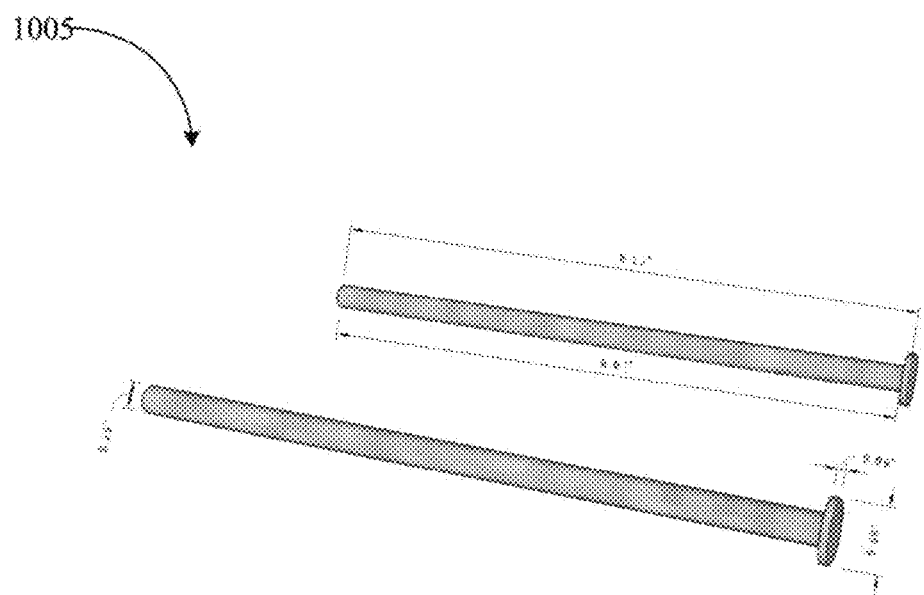

FIGS. 10A-10B illustrate exemplary rollers, wherein FIG. 10A shows exemplary rollers and FIG. 10B shows exemplary roller pins, in accordance with an embodiment of the present invention. Rollers 1000 may be used to allow for the axial rotation of a wheel on the commercial tire glide. Rollers 1000 may be installed using roller pins 1005 on roller table 900.

Figure 11A:
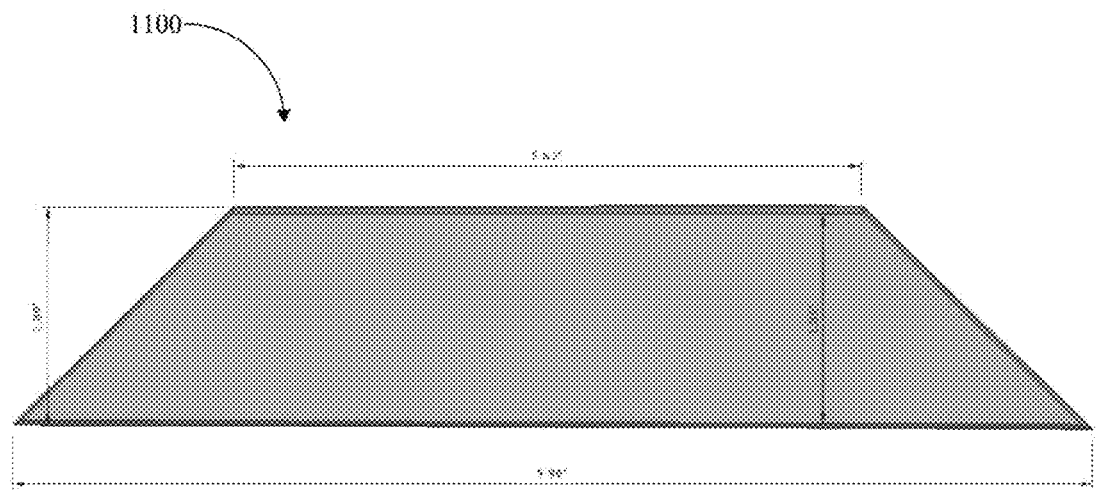
Figure 11B:
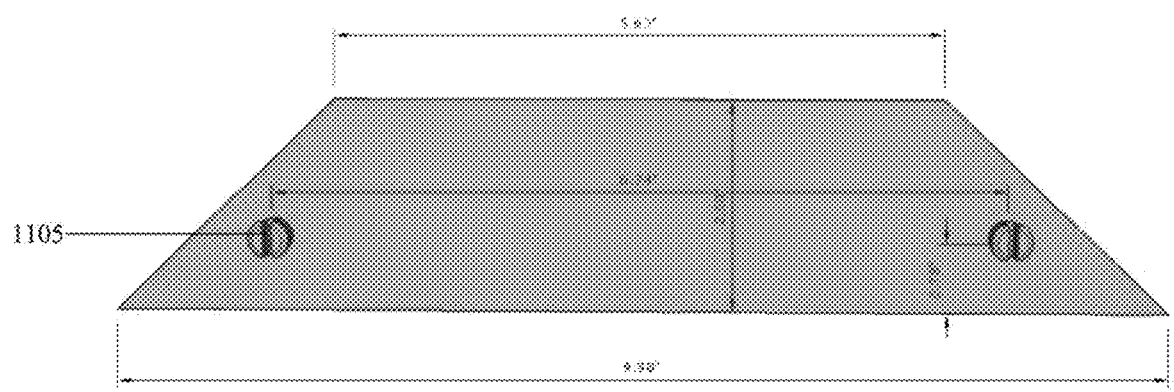

FIGS. 11A-11B illustrate an exemplary back plate, wherein FIG. 11A shows a front view of a back plate and FIG. 11B shows a back view of a back plate, in accordance with an embodiment of the present invention. With reference to FIGS. 6A-6B and FIGS. 11A-11B, back plate 1100 may be installed as the final piece of a commercial tire glide and may be used in combination with circular base 600 to house the internal components of the commercial tire glide. Back plate 1100 may include tabs 1105 for snapping into back plate openings 630. Alternative securement means may also be used to attach back plate 1100 to circular base 600, such as, without limitation, adhesive, fasteners, welding, screws, bolts, etc.

Figure 12:
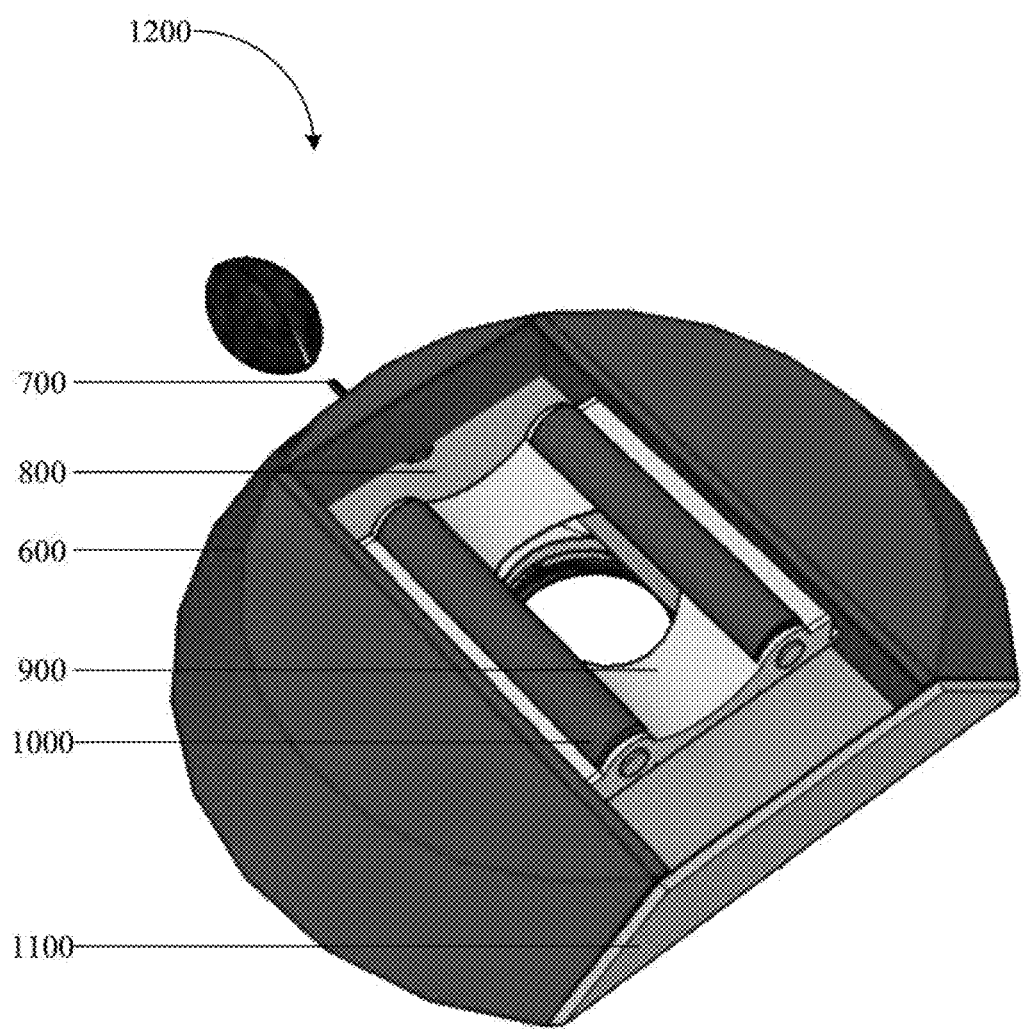
FIG. 12 illustrates a fully assembled commercial tire glide, in accordance with an embodiment of the present invention.

FIG. 12 illustrates a fully assembled commercial tire glide, in accordance with an embodiment of the present invention. Fully assembled, commercial tire glide 1200 may include, for example, without limitation, circular base 600, horseshoe airbag 700, glide plate 800, roller table 900, rollers 1000, and back plate 1100.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claim's construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a tire glide according to the present invention will be apparent to those skilled in the art. Various aspects of the invention have been described above by way of illustration, and the specific embodiments disclosed are not intended to limit the invention to the particular forms disclosed. The particular implementation of the tire glide may vary depending upon the particular context or application. By way of example, and not limitation, the tire glide described in the foregoing were principally directed to vehicle wheel installation and removal implementations; however, similar techniques may instead be applied to wheel transportation, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. An apparatus comprising:
  a glide table, said glide table is configured to provide support for a wheel intended for at least one of, removal, repair, inspection, installation, and replacement, wherein said glide table is further configured to be operable for aligning a wheel with wheel studs and sliding the wheel on the wheel studs, in which said glide table comprises:
    a body that is configured to provide support for the wheel; and
    a glide table floor portion;
  a pair of primary rollers, said pair of primary rollers being configured to provide support for the wheel, wherein said pair of primary rollers being operable to prevent the tire of the wheel to make contact with said glide table floor portion, in which each of said pair of primary rollers comprises:
    an inner cylindrical body; and
    outer cylindrical body enclosing said inner cylindrical body;
  a roller box section, said roller box section is configured to provide a foundation for said glide table, said roller box section comprises;

a plurality of walls;

a floor portion;

a plurality of secondary rollers, said plurality of secondary rollers is configured to be operable for allowing a lateral movement of said glide table along a central axis;

a base section, in which said base section comprises;

at least a plurality of internal walls;

a floor, wherein said internal walls and floor is configured to provide protection and support for at least one or more components of said apparatus;

at least two angled surfaces that are configured to increase a bottom surface area of said apparatus and create additional support for said glide table; and at least one or more handles that are configured to be operable for ease of transportation and placement of said apparatus.

2. The apparatus of claim 1, further comprising an airbag implement, wherein said airbag implement is configured to be operable for adjusting a vertical positioning of the wheel.

3. The apparatus of claim 2, in which said airbag implement comprises:

a body; and a neck that is configured to attach to an inflation means.

4. The apparatus of claim 3, wherein said internal walls and floor is configured to provide protection and support for said airbag implement, said roller box section, and said plurality of secondary rollers.

5. The apparatus of claim 1, in which said glide table further comprises a plurality of slots disposed at different intervals, wherein said different slot intervals are configured to allow for different size wheels to be supported, wherein a tire of a wheel resting on said pair of primary rollers does not make contact with the glide table floor portion.

6. The apparatus of claim 1, in which said base section further comprises at least one of a generally rectangular-shaped base section, a generally square-shaped base section, a generally round-shaped base section and a generally ovular-shaped base section.

7. The apparatus of claim 1, in which said glide table comprises a roller table having a body that is configured to provide support for the wheel, in which said glide table further comprises:

a plurality of roller pin openings;

one or more table bearings;

a central opening; and roller grooves.

8. An apparatus comprising:

a glide table, said glide table is configured to provide support for a wheel intended for at least one of, removal, repair, inspection, installation, and replacement, wherein said glide table is further configured to be operable for aligning a wheel with wheel studs and sliding the wheel on the wheel studs;

at least one or more primary rollers, said one or more primary rollers being configured to provide support for the wheel;

a roller box section, said roller box section is configured to provide a foundation for said glide table;

a plurality of secondary rollers, said plurality of secondary rollers is configured to be operable for allowing a lateral movement of said glide table along central axis;

a base section, in which said base section further comprises at least one of a generally rectangular-shaped base section, a generally square-shaped base section, a generally round-shaped base section and a generally ovular-shaped base section;

an airbag device wherein said airbag device is configured to be operable for adjusting a vertical positioning of the wheel.

9. The apparatus of claim 8, in which said glide table comprises a roller table having a body that is configured to provide support for the wheel.

10. The apparatus of claim 9, in which said glide table further comprises:

a plurality of roller pin openings;

one or more table bearings;

a central opening; and at least one or more roller grooves.

11. The apparatus of claim 9, in which said one or more primary rollers comprise of at least one or more table bearings.

12. The apparatus of claim 8, in which said glide table further comprises a plurality of slots disposed at different intervals, wherein said different slot intervals are configured to allow for different size wheels to be supported.

13. The apparatus of claim 12, in which each of said pair of primary rollers comprises at least an inner cylindrical body.

14. The apparatus of claim 13, in which each of said pair of primary rollers further comprises at least an outer cylindrical body enclosing said inner cylindrical body.

15. The apparatus of claim 8, in which said base section comprises at least a plurality of internal walls.

16. The apparatus of claim 15, in which said base section further comprises at least a floor, wherein said internal walls and floor are configured to provide protection and support for at least one or more components of said apparatus.

17. The apparatus of claim 16, in which said base section further comprises least two angled surfaces that are configured to increase a bottom surface area of said apparatus and create additional support for said glide table.

18. The apparatus of claim 17, in which said base section further comprises at least one or more handles that are configured to be operable for ease of transportation and placement of said apparatus.

19. The apparatus of claim 8, further comprising a back plate having at least one or more tabs, said at least one or more tabs being configured to be operable for snapping into corresponding back plate openings.

* * * * *